US012041413B2

(12) United States Patent
Rainer et al.

(10) Patent No.: US 12,041,413 B2
(45) Date of Patent: Jul. 16, 2024

(54) ACOUSTIC LOUDSPEAKER COMPRISING A CABINET AND A ROTARY MOUNTED SPEAKER

(71) Applicant: DEVIALET, Paris (FR)

(72) Inventors: Max Rainer, Paris (FR); Fabien Gerlier, Paris (FR); Antonin Anquetil, Paris (FR)

(73) Assignee: DEVIALET, Paris (FR)

(*) Notice: Subject to any disclaimer, the term of this patent is extended or adjusted under 35 U.S.C. 154(b) by 250 days.

(21) Appl. No.: 17/848,700

(22) Filed: Jun. 24, 2022

(65) Prior Publication Data

US 2022/0417654 A1 Dec. 29, 2022

(30) Foreign Application Priority Data

Jun. 28, 2021 (FR) ..................................... 21 06893

(51) Int. Cl.
*H04R 1/34* (2006.01)

(52) U.S. Cl.
CPC ....... *H04R 1/345* (2013.01); *H04R 2201/025* (2013.01)

(58) Field of Classification Search
CPC .......................... H04R 1/345; H04R 2201/025
USPC ........................................................ 381/387
See application file for complete search history.

(56) References Cited

U.S. PATENT DOCUMENTS 4,884,655 A * 12/1989 Freadman .............. H04R 1/323 181/207
6,070,694 A * 6/2000 Burdett .................. H04R 1/345 181/150
7,178,628 B2 * 2/2007 Gordon .................. H04R 1/025 381/387
8,213,669 B2 * 7/2012 Lin ........................ H04R 1/323 381/387
8,229,155 B2 * 7/2012 Maurer .................... H04R 1/26 381/387
8,243,963 B2 * 8/2012 Gladwin ................ H04R 9/063 381/387
8,351,639 B2 * 1/2013 Chang ...................... H04R 5/02 381/387
10,544,933 B2 * 1/2020 Hand ..................... H04R 1/028
2012/0263325 A1 10/2012 Freeman et al.

(Continued)

OTHER PUBLICATIONS

Preliminary Search Report for FR 2106893 dated Mar. 4, 2022.

*Primary Examiner* — Jeremy A Luks
(74) *Attorney, Agent, or Firm* — B. Aaron Schulman, Esq.; Stites & Harbison, PLLC

(57) ABSTRACT

Acoustic loudspeaker (10) comprising a cabinet (12) extending in a direction (L), and a speaker (14) defining an acoustic axis (X). The cabinet defines a first axis (V1) perpendicular to the direction, and a second axis (V2) perpendicular to the direction and to the first axis.

The acoustic loudspeaker is intended to be used in a first configuration, wherein the first axis is essentially vertical, and a second configuration, wherein the second axis is essentially vertical.

The speaker is movable relative to the cabinet around an axis of rotation (D) between a first position, wherein the acoustic axis defines with the second axis a first angle less than 30°, and a second position, in which the acoustic axis defines with the first axis (V1) a second angle less than 30°. The axis of rotation makes two angles between 40° and 50° with the first axis and the second axis.

10 Claims, 4 Drawing Sheets

(56) References Cited

U.S. PATENT DOCUMENTS

| | | | | |
|---|---|---|---|---|
| 2014/0321689 | A1* | 10/2014 | Chen | H04R 1/345 381/387 |
| 2019/0191248 | A1 | 6/2019 | Stead et al. | |
| 2020/0221217 | A1 | 7/2020 | Kim et al. | |

* cited by examiner

ACOUSTIC LOUDSPEAKER COMPRISING A CABINET AND A ROTARY MOUNTED SPEAKER

BACKGROUND OF THE INVENTION

Field of the Invention

The present invention relates to a loudspeaker which includes a cabinet extending in one direction, and at least one rotary loudspeaker mounted on the cabinet, the loudspeaker comprising a frame, and a membrane adapted to emit sound waves, the membrane being movable relative to the frame along an acoustic axis of the loudspeaker, the cabinet defining a first axis perpendicular to the direction, and a second axis perpendicular to the direction and to the first axis; the acoustic loudspeaker being intended to be used at least in a first configuration, in which the first axis is substantially vertical, and a second configuration, in which a second axis is substantially vertical.

Description of Related Art

This acoustic loudspeaker has for example an elongated shape in the direction and is advantageously used for the sound system of a television screen, for example a large flat screen. Such a loudspeaker is commonly referred to as a "soundbar". It generally comprises a main loudspeaker, located for example at equal distance from the ends of the cabinet, and secondary loudspeakers, located for example in the ends.

The first configuration corresponds to a use in which the loudspeaker is typically placed on a horizontal surface, for example a piece of furniture, a shelf or the ground, in front of or under the screen, the second axis being substantially directed towards a user located in front the television screen. The acoustic axis of the main loudspeaker is then generally directed substantially towards the user, possibly slightly upwards.

It is known to use such an acoustic loudspeaker in the second configuration, in which it is typically fixed to a vertical surface, for example a partition, below or above the screen, the first axis being substantially directed towards the user. To pass from the first configuration to the second configuration, the acoustic loudspeaker is pivoted 90° around the direction, so that the face of the cabinet which was directed towards the user in the first configuration is directed upwards, for reasons related to the layout of the secondary loudspeakers. Then the acoustic loudspeaker is turned 180° around the second axis (thus vertical), so that the face of the cabinet which was directed upwards in the first configuration is directed towards the user in the second configuration, and not towards the partition.

The problem is then that the acoustic axis of the speaker is no longer directed substantially towards the user, but towards the ceiling or the sky. To remedy this problem, it is known to use a second main speaker, mounted on the cabinet so that its acoustic axis is in the right direction. However, this makes the soundbar heavier and more expensive, somewhat unnecessarily, since only one of the two main speakers is really useful in each of the configurations.

One solution would be for the main speaker to have an acoustic axis forming an angle of 45° with a horizontal plane in the first configuration. The acoustic axis would also form an angle of 45° with the horizontal in the second configuration. However, an angle of 45° does not allow good acoustic rendering and is therefore not desirable.

Another solution would be to mount the main rotary speaker with respect to the cabinet, around an axis parallel to the direction, and to move it from a first position, occupied in the first configuration, to a second position, occupied in the second configuration. The passage from the first position to the second position would be a rotation of substantially 90° of the main speaker relative to the cabinet, which would put the acoustic axis back towards the direction of the user.

However, this solution has several drawbacks. First of all, the pivot connections between the main speaker and the cabinet become visible and unattractive, and impossible to conceal in the case of a globular-shaped loudspeaker received in a flared housing formed by the cabinet.

Also if the speaker has a distinctive brand on its surface, such as a logo, showing some correct orientation for the user in the first configuration of the acoustic loudspeaker and the first position of the speaker, this orientation is reversed and incorrect in the second configuration and the second position. In other words, for the user, the logo is correctly oriented in the first configuration, and is upside down in the second configuration.

Finally, the pivot links make it difficult, if not impossible, to add passive membranes (suitable for emitting sound waves without being excited by a coil) on either side of the main speaker in the mentioned direction. Indeed, these membranes would be crossed by the pivot connections.

A target of the invention is to overcome all or part of the above drawbacks, and in particular to propose an acoustic loudspeaker such that a logo placed on the main speaker is not upside down in the second configuration, and having a comparable quality acoustics and a competitive cost.

BRIEF SUMMARY OF THE INVENTION

To this end, the subject of the invention is an acoustic loudspeaker comprising a cabinet extending in one direction, and at least one speaker mounted on the cabinet, the speaker comprising a chassis, and a membrane adapted to emit sound waves, the membrane being movable relative to the chassis along an acoustic axis of the speaker, the cabinet defining a first axis perpendicular to the direction, and a second axis perpendicular to the direction and to the first axis; the acoustic loudspeaker being intended be used at least in a first configuration, in which the first axis is substantially vertical, and a second configuration, in which the second axis is substantially vertical, the speaker being movable relative to the cabinet in rotation around an axis of rotation between a first position, intended to be occupied when the acoustic loudspeaker is in the first configuration and in which the acoustic axis defines with the second axis a first angle less than 30° in absolute value, and a second position, intended to be used when the acoustic loudspeaker is in the second configuration and in which the acoustic axis defines with the first axis a second angle less than 30° in absolute value, the axis of rotation defining with the first axis a third angle comprised between 40° and 50° in absolute value, and with the second axis a fourth angle comprised between 40° and 50° in absolute value.

According to particular embodiments, the acoustic loudspeaker comprises one or more of the following characteristics, taken separately or according to all the technically possible combinations:

- the axis of rotation is located in a plane defined by the first axis and the second axis;
- the third angle and the fourth angle are between 43° and 47° in absolute value;

the third angle is substantially equal to 45° in absolute value;

the first angle and the second angle are less than 15° in absolute value;

the speaker moves from the first position to the second position by a rotation of an angle comprised between 160° and 200° around the rotation axis;

the cabinet has an oblong shape in the direction, the cabinet having two ends opposite to each other in the direction, the acoustic loudspeaker comprising speakers mounted at said two ends;

the speaker is located equidistant from both ends;

the speaker comprises an outer surface and a distinctive sign on the outer surface, the distinctive sign having a certain orientation with respect to the second axis when the acoustic loudspeaker is in the first configuration and the speaker in the first position, and having the same orientation with respect to the first axis when the acoustic loudspeaker is in the second configuration and the speaker in the second position; and the speaker comprises at least one passive membrane located on one side of the chassis in the direction.

BRIEF DESCRIPTION OF THE SEVERAL VIEWS OF THE DRAWING(S)

The invention will be better understood on reading the following description, given solely by way of example and made with reference to the appended drawings, in which.

DETAILED DESCRIPTION OF THE INVENTION

Figure 1:
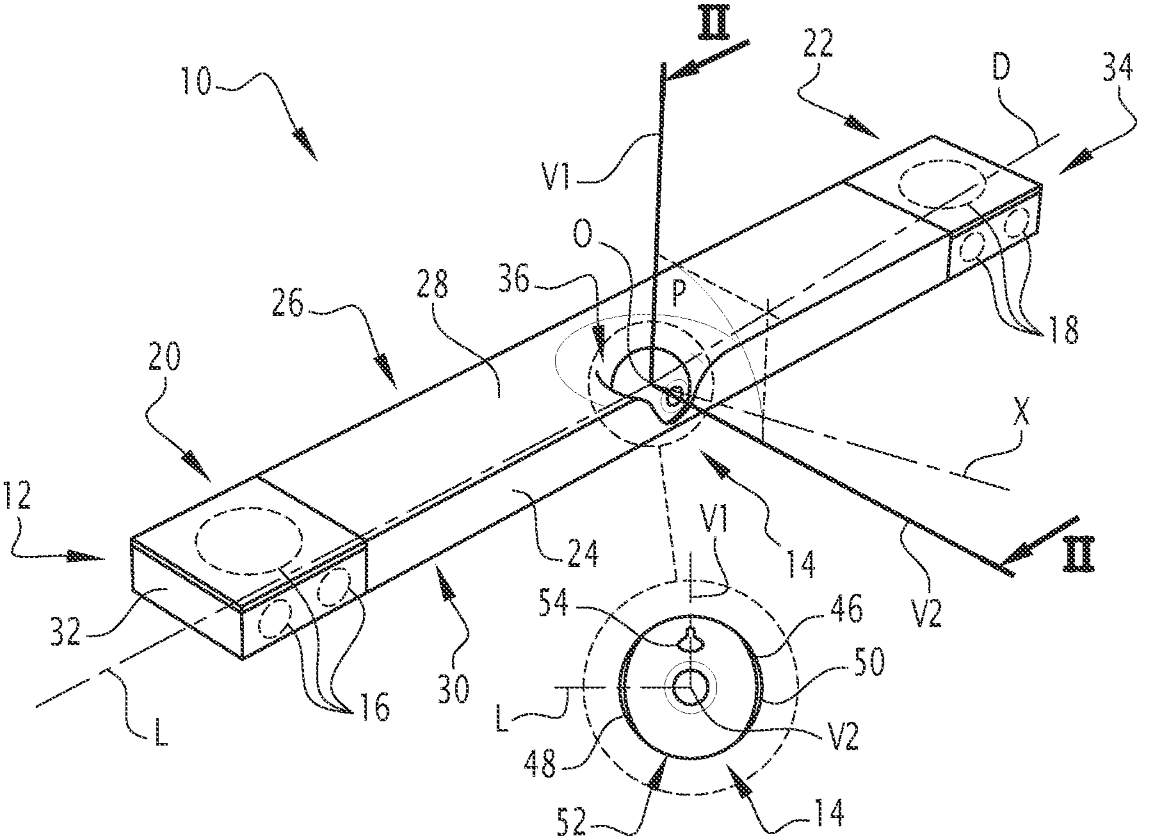
FIG. 1 is a schematic view, in perspective, of an acoustic loudspeaker according to the invention in the first configuration, the speaker being in the first position with respect to the cabinet.
Figure 2:
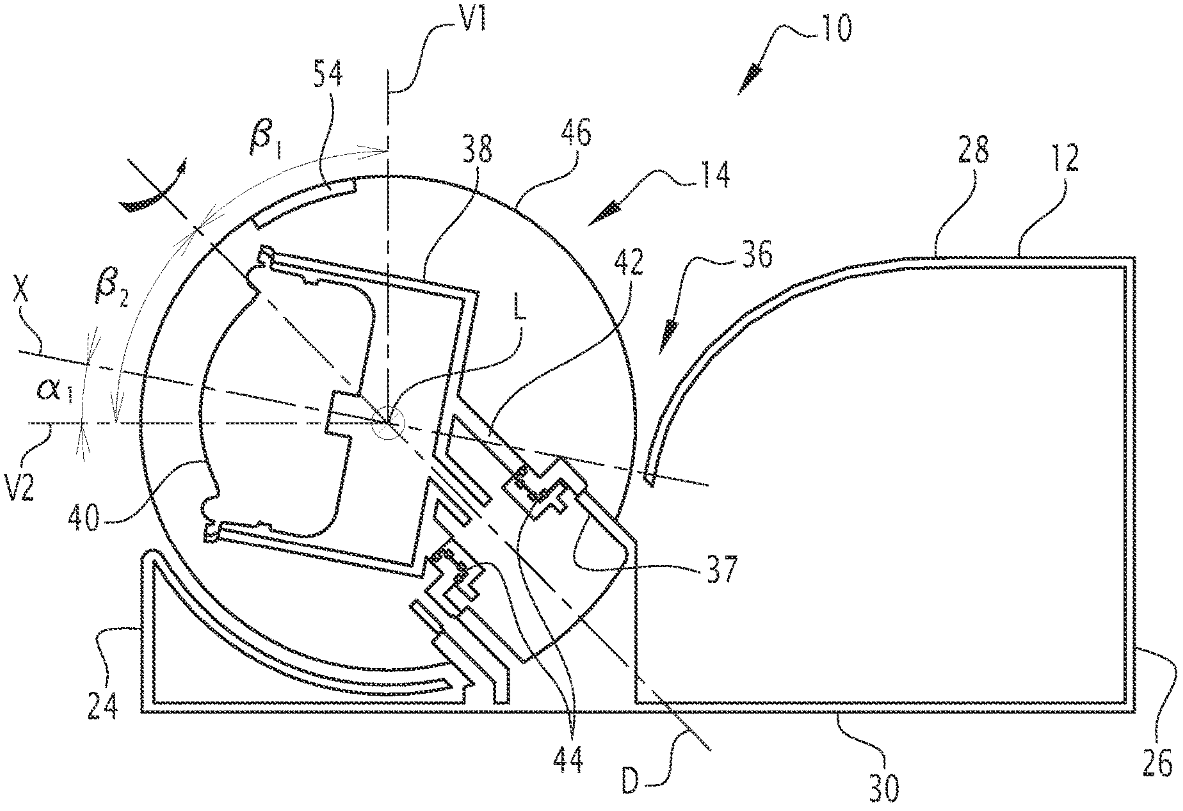
FIG. 2 is a schematic view, in section along a level perpendicular to the direction, of the acoustic loudspeaker shown in FIG. 1.
Figure 3:
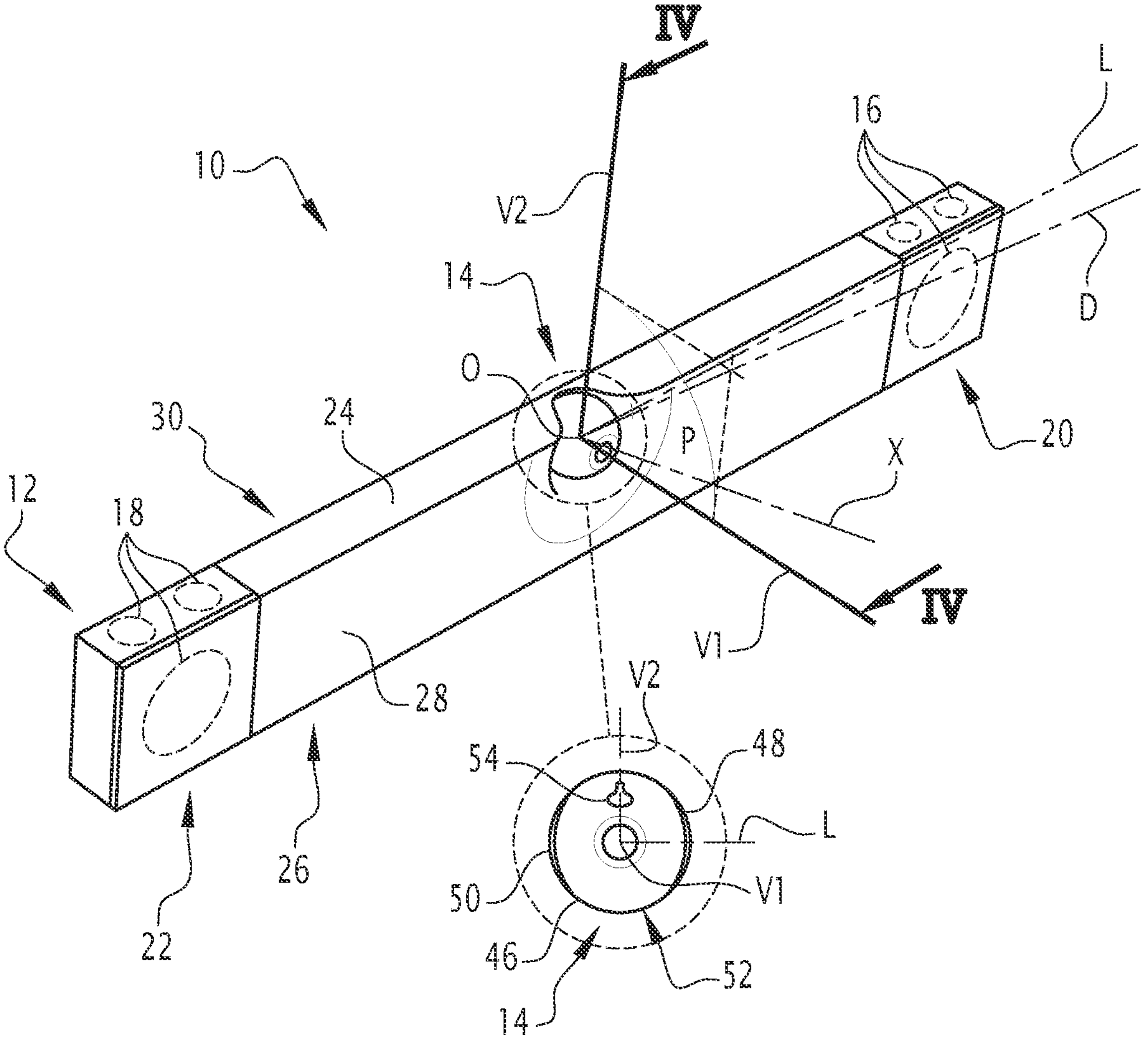
FIG. 3 is a schematic view, in perspective, of the acoustic loudspeaker shown in FIGS. 1 and 2, but in the second configuration, the speaker being in the second position relative to the cabinet.
Figure 4:
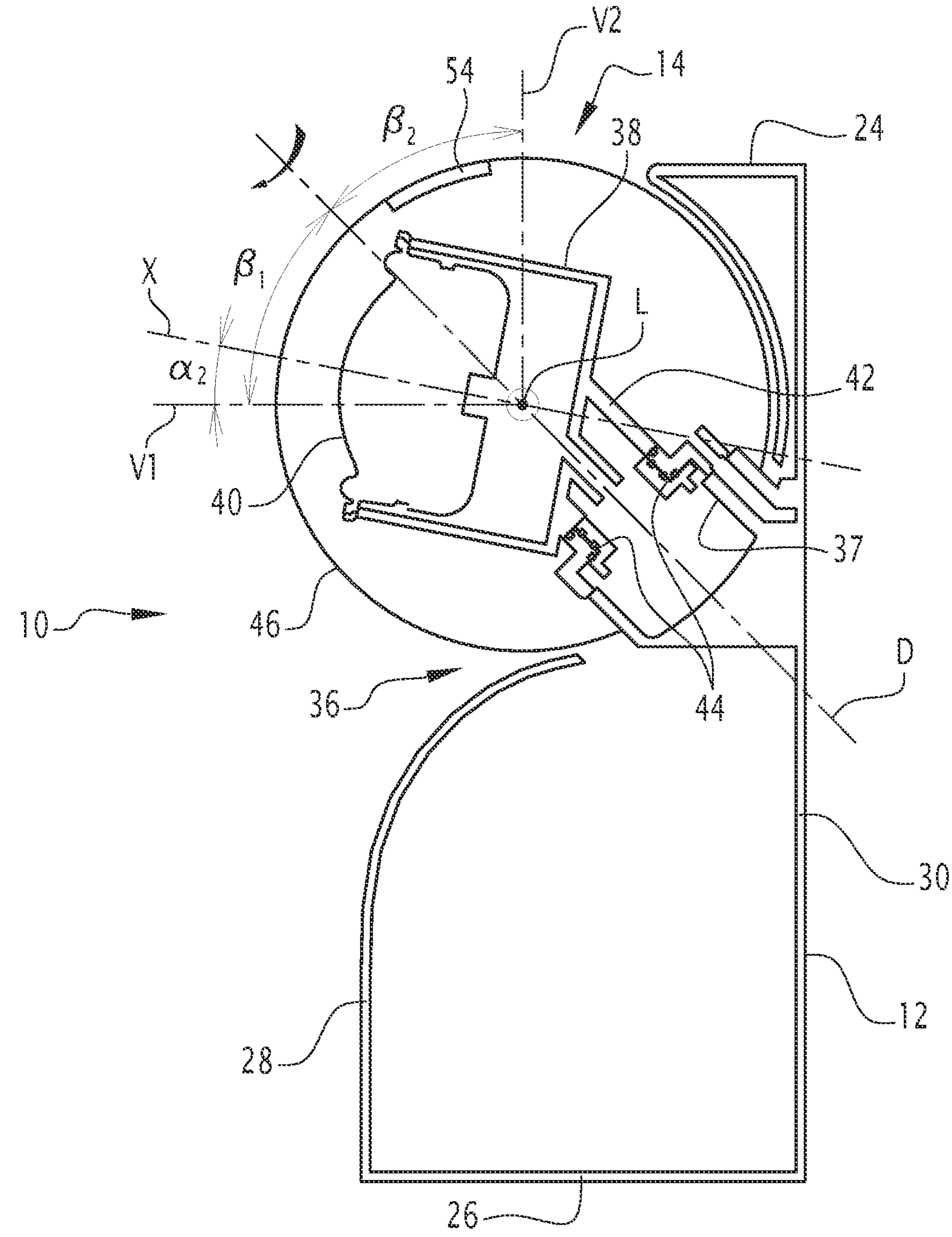
FIG. 4 is a schematic view, in section along a plane perpendicular to the direction, of the acoustic loudspeaker shown in FIG. 3.

With reference to FIGS. 1 to 4, an acoustic loudspeaker 10 according to the invention is described.

The acoustic loudspeaker 10 is, for example, a sound bar, advantageously adapted to add sound, possibly with other acoustic elements (not shown), to a television screen (not shown).

The acoustic loudspeaker 10 comprises a cabinet 12 extending in a direction L, and a speaker 14 mounted on the cabinet 12. Advantageously, the acoustic loudspeaker 10 also comprises speakers 16, 18 mounted in opposite ends 20, 22 of the cabinet 12 in the direction L.

The acoustic loudspeaker 10 is intended to be used in a first configuration (FIGS. 1 and 2), in which a first axis V1 defined by the cabinet 12 and perpendicular to the direction L is substantially vertical; and in a second configuration (FIGS. 3 and 4), in which a second axis V2 defined by cabinet 12 and perpendicular to first axis V1 in direction L is substantially vertical.

In the first configuration (FIG. 1), the acoustic loudspeaker 10 is intended to rest on a horizontal surface, for example on a piece of furniture or the floor (not shown). The second axis V2 is intended to be directed towards a user (not shown).

In the second configuration (FIG. 3), the acoustic loudspeaker 10 is intended to be fixed on a vertical surface, for example a partition (not shown). The first axis V1 is intended to be directed towards the user.

At each of the ends 20, 22, the speakers 16, 18 are for example one, two or three in number.

According to a variant not shown, there are no speakers in the ends 20, 22.

The cabinet 12 advantageously has an oblong shape in the direction L, for example parallelepipedic.

The direction L is a longitudinal direction in the example shown.

Alternatively (not shown), the direction L is not longitudinal. The cabinet 12 is then more extended in at least one other direction perpendicular to the direction L.

According to variants not shown, the cabinet 12 has other shapes, for example spherical, elliptical, or cylindrical, or with the ends 20, 22 rounded or not.

The cabinet 12 is for example wider along the second axis V2 than along the first axis V1.

According to a variant not shown, it is the reverse.

In the example, the cabinet 12 comprises a front face 24 perpendicular to the second axis V2 and oriented towards the user (not shown) in the first configuration, a rear face 26, an upper face 28 perpendicular to the first axis V1, and an underside 30. The cabinet also has two end faces in the direction L, for example perpendicular to the latter.

The cabinet 12 defines for example a housing 36 in which the speaker 14 is partially located, and a support 37 advantageously located at the bottom of the housing 36 on which the speaker is mounted.

The housing 36 is for example located at an equal distance from the ends 20, 22 in the direction L. The housing 36 advantageously extends over the upper face 28 and over the front face 24. In other words, the housing 36 opens onto the upper face 28 and onto the front face 24.

The housing 36 has for example a flared shape around the first axis V1, and opening onto the front face 24 along the second axis V2. The housing 36 advantageously has a shape resulting from the deformation of an elastic surface (upper face 28) under the effect of a heavy ball (the speaker 14).

The lower face 30 is advantageously adapted to rest on the horizontal surface in the first configuration, or to be fixed on the vertical surface in the second configuration.

The speaker 14 is for example located at an equal distance from the ends 20, 22 in the direction L.

The speaker 14 comprises a frame 38 (FIGS. 2 and 4), and a membrane 40 adapted to emit sound waves, the membrane being movable relative to the frame 38 along an acoustic axis X.

The speaker 14 is movable relative to the cabinet 12 in rotation around an axis of rotation D between a first position (FIGS. 1 and 2), intended to be occupied when the acoustic loudspeaker 10 is in the first configuration, and a second position (FIGS. 3 and 4), intended to be occupied when the acoustic loudspeaker is in the second configuration.

The speaker 14 advantageously comprises a fixing part 42 integrated with the frame 38 and mounted, for example using ball bearings 44, on the support 37 so as to form a notched pivot connection.

The speaker 14 advantageously comprises an outer casing 46, for example with a globular shape, integral with the fixing part 42 and enveloping the frame 38 and the membrane 40.

Advantageously, the speaker 14 comprises two passive membranes 48, 50 mounted on the outer casing 46, and for example opposite to each other in the L direction.

The speaker 14 passes for example from the first position to the second position by a rotation around the axis of rotation D of an angle comprised between 160° and 200°, for example approximately 180°.

In the first position, the acoustic axis X defines with the second axis V2 a first angle $\alpha 1$ less than 30° in absolute value, preferably less than 15° in absolute value.

In the second position, the acoustic axis X defines with the first axis V1 a second angle $\alpha 2$ less than 30° in absolute value, preferably less than 15° in absolute value.

By "in absolute value", we mean that any orientation of the angle is not taken into account.

The axis of rotation D defines with the first axis V1 a third angle $\beta 1$ comprised between 40° and 50° in absolute value, and with the second axis V2 a fourth angle $\beta 2$ constituted between 40° and 50° in absolute value. The axis of rotation D advantageously lies in a plane P defined by the first axis V1 and the second axis V2.

The third angle $\beta 1$ and the fourth angle $\beta 2$ are advantageously between 43° and 47° in absolute value. For example, the third angle $\beta 1$ is substantially equal to 45° in absolute value.

The outer casing 46 has an outer surface 52 advantageously bearing a distinctive sign 54, for example a logo.

The distinctive sign 54 has a certain orientation with respect to the second axis V2 when the acoustic loudspeaker 10 is in the first configuration and the speaker 14 in the first position, and has the same orientation with respect to the first axis V1 when the acoustic loudspeaker 10 is in the second configuration and the speaker in the second position.

The operation of the acoustic loudspeaker 10 will now be described.

The first configuration (FIGS. 1 and 2) corresponds to a use in which the acoustic loudspeaker 10 typically is placed on the horizontal surface (not shown). The second axis V2 is horizontal and directed towards the user. The speaker 14 is in the first position. Thus, the acoustic axis X forms the first angle $\alpha 1$ with the second axis V2 and is directed substantially towards the user, possibly slightly upwards. The distinctive sign 54 is correctly oriented.

To pass from the first configuration to the second configuration (FIGS. 3 and 4), the acoustic loudspeaker 10 is for example pivoted at 90° in absolute value around the direction L so that the front face 24 is directed upwards, then the acoustic loudspeaker is turned 180° around the second axis V2 (then vertical), so that the upper face 28 is directed towards the user and not towards the cabinet. The first axis V1 is horizontal and directed towards the user.

If the speaker 14 were left in the first position, in which the acoustic axis X forms the first angle $\alpha 1$ with the second axis V2, the acoustic axis X would not be directed towards the user, but clearly upwards. Furthermore, at this stage, the distinctive sign 54, seen by the user, is upside down.

Also, the speaker 14 is moved relative to the cabinet 12 from the first position to the second position. In the second position, the acoustic axis X forms the second angle $\alpha 2$ with the first axis V1 and again directed towards the user, possibly a little upwards. In the example shown, the passage from the first position to the second position is a rotation of 180° around the axis of rotation D which forms an angle of 45° in absolute value with the horizontal. This puts the speaker 14 in the same orientation relative to the user as originally occupied.

Furthermore, as the rotation is substantially 180°, it perfectly reverses the orientation of the distinctive sign seen by the user. The orientation of the distinctive sign 54 is therefore again correct once the loudspeaker 14 is in the second position.

The example described is in a way a preferred example, in which the inversion of the orientation of the distinctive sign 54 by the passage from the first position to the second position is "perfect", because the axis of rotation D is in the plane P, and the axis of rotation D forms an angle of 45° in absolute value with these axes, and the rotation is 180°.

However, it is understood that an inversion is nevertheless possible even if these three conditions are not observed strictly. Indeed, it is understood that it is possible to obtain an interesting inversion, even when the axis of rotation D is not quite in the plane P, does not form quite an angle of 45° in absolute value with the first axis V1 and the second axis V2, or the rotation is not exactly 180°. Thus, the invention cannot be reduced to these three "particular" conditions.

Thanks to the features described above, in particular the passage from the first position to the second position, the distinctive sign 54 placed on the speaker 14 is not inverted in the second configuration and the acoustic axis X remains correctly directed. Thus, the acoustic loudspeaker 10 retains a comparable acoustic quality, and a competitive cost.

In addition, it is understood that the invention makes it possible to mount the speaker 14 "from the rear" on the cabinet 12, at the bottom of the housing 36. This makes it easy to hide the pivot link connecting the speaker 14 to the cabinet 12.

This also makes it possible, for example, to provide one or two passive membranes 48, 50 located on either side of the speaker 14 in direction L. Such an arrangement would be impossible in the presence of a pivot connection whose axis would itself be in direction L. In the invention, the axis of rotation D is located in, or is close to the plane P, that is to say that it is basically perpendicular to the direction L. The pivot connection is therefore remote from the passive membrane(s).

The invention claimed is:

1. An acoustic loudspeaker comprising a cabinet extending along a direction, and at least one speaker mounted on the cabinet, the speaker comprising a frame, and a membrane adapted to emit sound waves, the membrane being movable relative to the chassis along an acoustic axis of the speaker, the cabinet defining a first axis perpendicular to the direction, and a second axis perpendicular to the direction and to the first axis, the acoustic loudspeaker being intended to be used at least in a first configuration, wherein the first axis is substantially vertical, and a second configuration, wherein the second axis is substantially vertical, the speaker being movable with respect to the cabinet in rotation around an axis of rotation between a first position, intended to be occupied when the acoustic loudspeaker is in the first configuration and wherein the acoustic axis defines with the second axis a first angle less than 30° in absolute value, and a second position, intended to be occupied when the acoustic loudspeaker is in the second configuration and wherein the axis acoustic defines with the first axis a second angle less than 30° in absolute value, the axis of rotation defining with the first axis a third angle comprised between 40° and 50° in absolute value, and with the second axis a fourth angle comprised between 40° and 50° in absolute value.

2. The acoustic loudspeaker according to claim 1, wherein the axis of rotation lies in a plane defined by the first axis and the second axis.

3. The acoustic loudspeaker according to claim 1, wherein the third angle and the fourth angle are between 43° and 47° in absolute value.

4. The acoustic loudspeaker according to claim 3, wherein the third angle is equal to 45° in absolute value.

5. The acoustic loudspeaker according to claim 1, wherein the first angle and the second angle are less than 15° in absolute value.

6. The acoustic loudspeaker according to claim 1, wherein the speaker passes from the first position to the second position by a rotation of an angle comprised between 160° and 200° around the axis of rotation.

7. The acoustic loudspeaker according to claim 1, wherein the cabinet has an oblong shape in the direction, the cabinet having two ends opposite to each other in the direction, the acoustic loudspeaker having speakers mounted at said two ends.

8. The acoustic loudspeaker according to claim 7, wherein the speaker is located equidistant from the two ends.

9. The acoustic loudspeaker according to claim 1, wherein the speaker comprises an outer surface and a distinctive sign on the outer surface, the distinctive sign having a specific orientation relative to the second axis when the acoustic loudspeaker is in the first configuration and the speaker is in the first position, and having the same orientation relative to the first axis when the acoustic loudspeaker is in the second configuration and the speaker is in the second position.

10. The acoustic loudspeaker according to claim 1, wherein the speaker comprises at least one passive diaphragm located on one side of the frame in the direction.

* * * * *